United States Patent [19]

Alexander

[11] Patent Number: 4,978,304
[45] Date of Patent: Dec. 18, 1990

[54] TRAINING AID FOR SHOELACE TYING

[76] Inventor: Dean D. Alexander, 1839 Foothill Blvd., La Verne, Calif. 91750

[21] Appl. No.: 396,291

[22] Filed: Aug. 21, 1989

[51] Int. Cl.$^5$ .............................................. G09B 9/00
[52] U.S. Cl. ..................................... 434/260; 36/136
[58] Field of Search .............. 434/260, 258; 36/7.1 R, 36/7.1 A, 7.2, 7.3, 7.4, 7.5, 7.6, 136, 1.5; 128/166.5, 165

[56] References Cited

U.S. PATENT DOCUMENTS

| | | | |
|---|---|---|---|
| 616,524 | 12/1898 | Cartledge | 128/165 X |
| 850,281 | 4/1907 | Walter | 128/165 X |
| 1,050,482 | 1/1913 | Mattler | 128/165 |
| 1,091,931 | 1/1914 | Harris | 128/166.5 |
| 1,104,357 | 7/1914 | Hassel | 36/7.1 R |
| 1,627,596 | 5/1927 | Cutshaw | 128/166.5 |
| 1,709,635 | 4/1929 | Skoglund | 128/166.5 |
| 1,755,568 | 4/1930 | Sochor | 128/166.5 |
| 2,278,626 | 4/1942 | Vasko | 128/165 |
| 3,546,788 | 12/1970 | Drumm | 434/260 |
| 3,997,982 | 12/1976 | Holland | 434/260 |
| 4,288,930 | 9/1981 | Bornell | 36/132 |
| 4,661,072 | 4/1987 | White | 434/260 |
| 4,766,682 | 8/1988 | Mallay | 36/136 X |

FOREIGN PATENT DOCUMENTS 81602 12/1919 Switzerland ......................... 36/7.2

Primary Examiner—Richard J. Apley
Assistant Examiner—Rachel M. Healey
Attorney, Agent, or Firm—Roy A. Ekstrand

[57] ABSTRACT

A training aid for shoelace tying includes an expandable generally cylindrical sleeve having a center passage adapted to be received upon a variety of shoes and alternatively to be placed upon a human hand. A plurality of eyelets are supported upon the sleeve and arranged generally in an equally spaced array of two rows. A flexible shoelace is secured to the sleeve through the eyelets such that the end portions of the shoelace emerge from the sleeve interior and extend outwardly therefrom. In an alternate embodiment, the sleeve is formed largely of a nonelastic material and includes an elastic panel which provides expansion of the sleeve to accommodate different attachments.

6 Claims, 1 Drawing Sheet

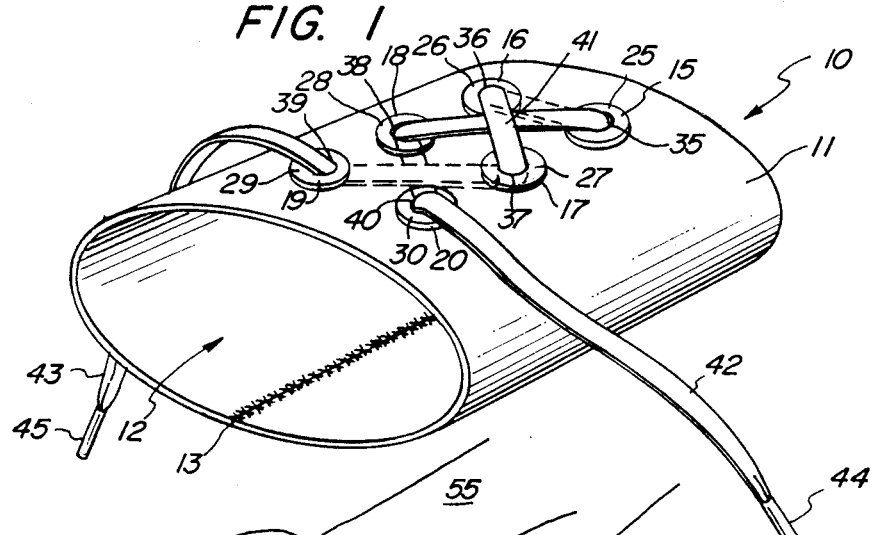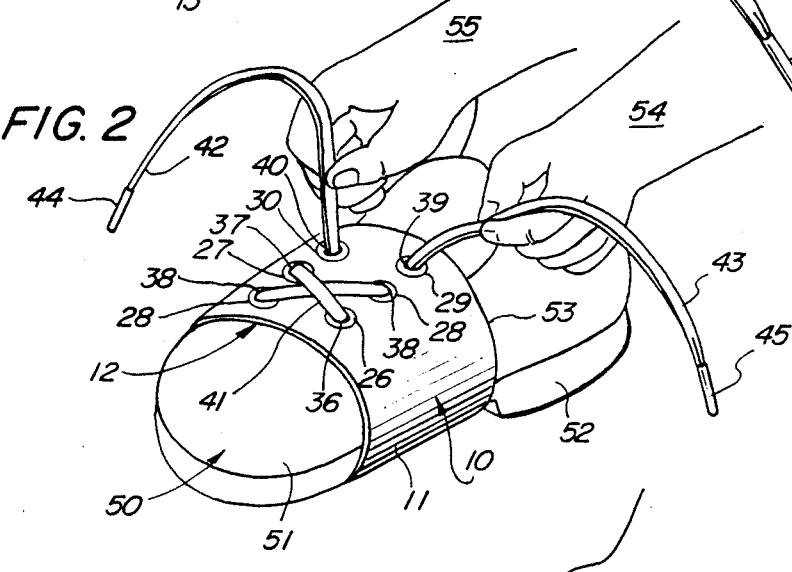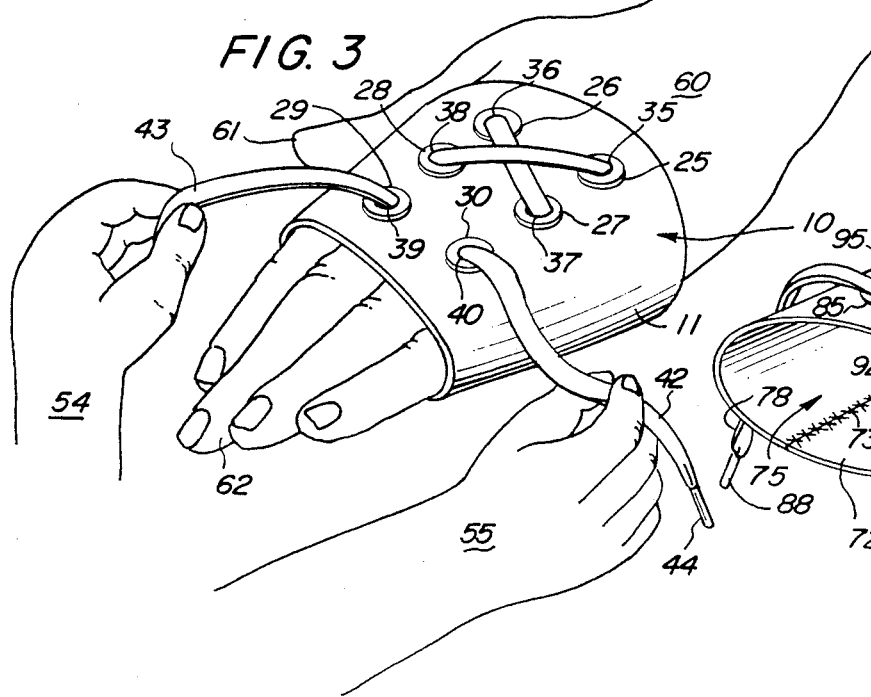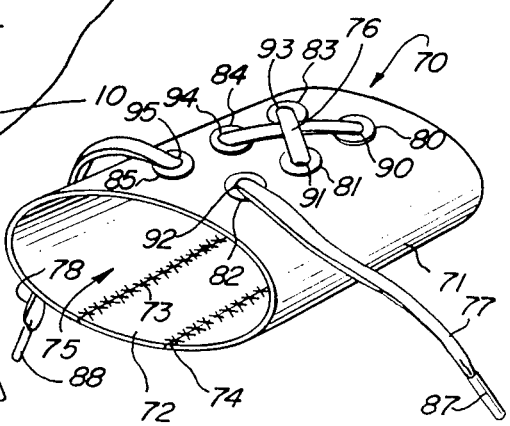

TRAINING AID FOR SHOELACE TYING

FIELD OF THE INVENTION

This invention relates generally to teaching aids and particularly for those used to instruct children or learning impaired persons in the process of shoelace tying.

BACKGROUND OF THE INVENTION

One of the tedious and difficult tasks for parents and teachers in the rearing of young children involves the teaching of shoelace tying. The laces are difficult to manipulate and the shoelace knot is relatively intricate and often challenging to children with small hands. The problem also exists in the care and instruction of persons who are learning impaired for a variety of reasons. While the task is difficult enough on children having normal learning abilities, a great number of children are burdened with learning disabilities or physical handicaps which further exacerbate the problem.

In addition to the difficulties resulting from the youth or reduced capacity of the learner, the process of teaching the learner is made more difficult due to the positions required to manipulate laces on the learner's shoes when they are placed on the learner's feet. The learner and the teacher must frequently get into difficult positions and, for many learners, the shoes themselves are hard to reach due to physical limitations, excessive weight and so on. The process is further encumbered by the fact that the teacher and the learner are usually on opposite sides of the shoe and instructions characterized as right or left must be adjusted by the teacher to provide accurate communication to the learner.

For years teachers and parents have attempted to meet these difficulties through various devices and teaching methods. These have included the use of poems or limericks to aid in memorizing the intricate shoelace knot. Also, those instructing learners have often removed the learner's shoe and have tied it in their lap or the learner's lap to improve the teaching process. Practitioners in the art have developed various teaching aids including shoe-like teaching aids and instructions intended to provide entertainment as well as teaching. Some of the developed teaching aids are enlarged and have exaggerated laces, lace holes and shoe tongues to aid the learner.

While the previously developed devices and methods provide assistance in the training process, there remains a need in the art for an improved training aid for shoelace tying.

SUMMARY OF THE INVENTION

Accordingly, it is a general object of the present invention to provide an improved training aid for shoelace tying. It is a more particular object of the present invention to provide an improved training aid for shoelace tying which may be transferred between shoes. It is a still more particular object of the present invention to provide an improved training aid for shoelace tying which maintains the laces in easy view and which may be conveniently used in a variety of positions.

In accordance with the present invention, there is provided a training aid for shoelace tying comprising an expandable sleeve configured to be attachable to the toe and instep portion of a shoe and expandable to accommodate a range of shoe sizes and lace means for supporting a shoelace such that the end portions of the shoelace extend from the expandable sleeve.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 is a perspective view of a training aid for shoelace tying constructed in accordance with the present invention;

FIG. 2 is a perspective view of the present invention training aid positioned upon a typical shoe;

FIG. 3 is a perspective view of the present invention training aid positioned upon a learner's hand in an alternate teaching method; and FIG. 4 is a perspective view of an alternate embodiment of the present invention training aid for shoelace tying.

DESCRIPTION OF THE PREFERRED EMBODIMENTS

FIG. 1 sets forth a perspective view of a training aid constructed in accordance with the present invention and generally referenced by numeral 10. Training aid 10 includes a generally cylindrical sleeve member 11 formed of a planar sheet of expandable or elastic material formed into a generally cylindrical sleeve and joined at a seam 13. Thus, sleeve 11 forms a center passage 12 which extends entirely through sleeve 11. Sleeve 11 further defines a plurality of apertures 15, 16, 17, 18, 19 and 20 formed in two rows of generally equally spaced positions. A corresponding plurality of metal eyelets 25 through 30 are supported within aperture 15 through 20. Specifically, eyelet 25 is received within aperture 15, eyelet 26 within aperture 16, eyelet 27 within aperture 17, eyelet 28 within aperture 18, eyelet 29 within aperture 19, and eyelet 30 within aperture 20. In their preferred form, eyelets 25 through 30 comprise generally annular members defining corresponding center apertures 35 through 40. In further accordance with conventional eyelet fabrication, eyelet 25 through 30 are secured within apertures 15 through 20 respectively using a conventional staking or riveting operation. A shoelace 41 which may be constructed in accordance with conventional fabrication techniques is formed of a flexible elongated material and is threaded through apertures 35 through 40 in accordance with the desired lacing configuration. Shoelace 41 defines a pair of end portions 42 and 43 which in turn support rigid end tabs 44 and 45. Tabs 44 and 45 are constructed in accordance with conventional fabrication techniques and are utilized to facilitate the lacing operation. It should be noted that any number of lacing configurations may be utilized for securing shoelace 41 within eyelets 25 through 30 of training aid 10 without departing from the spirit and scope of the present invention. In its preferred form, however, the lacing of shoelace 41 within eyelets 25 through 30 is carried forward so as to provide end 42 emerging outwardly through aperture 40 of eyelet 30 and end 43 emerging outwardly through aperture 39 of eyelet 29 in the manner shown in FIG. 1.

FIG. 2 sets forth the positioning of training aid 10 upon a typical shoe 50. In accordance with conventional fabrication techniques, shoe 50 includes a toe portion 51, a heel portion 52 and an instep portion 53. As described above, training aid 10 is formed of a resilient expandable sleeve 11 having a passage therethrough and supporting a plurality of eyelets 25 through 30 in two rows in a generally equally spaced relationship. As is also described above, eyelets 25 through 30 define corresponding apertures 35 through 40. Lace 41, as described above, is laced through apertures 35 through 40 of eyelets 25 through 30 respectively such that end portions 42 and 43 emerge outwardly from apertures 39 and 40 respectively of eyelets 29 and 30.

In accordance with an important aspect of the present invention, it should be noted that expandable sleeve 11 permits training aid 10 to be placed upon toe portion 51 and instep portion 53 of shoe 50. When thus positioned, end portions 42 and 43 of shoelace 41 are positioned in the same manner as the normal shoelace whould occupy upon shoe 50. Thus in the position shown in FIG. 2, training aid 10 positions shoelace ends 42 and 43 in a manner permitting the learner to extend hands 54 and 55 to grasp shoelace 41 in the same manner as they would in tying the learner's shoe. In accordance with a further advantage of the present invention it should be noted that since training aid 10 is readily removable from shoe 50, the instructor may at any time in the tying process simply remove training aid 10 from shoe 50 and bring training aid 10 to a raised position in which the learner may more clearly view the tying process. In addition, because training aid 10 is readily removable from shoe 50, the instructor may simply remove training aid 10 from shoe 50 and with accompanying instruction place training aid 10 upon the instructor's shoe and carry forward with a teaching description of the tying process. In accordance with a further advantage of the present invention, it should be noted that the resilience of sleeve 11 permits training aid 10 to be positioned upon a wide variety of shoe sizes and configurations which further increases the flexibility and usefulness of training aid 10. Of course, it will be apparent to those skilled in the art that training aid 10 readily accommodates being positioned on either right or left shoes.

FIG. 3 sets forth an alternate use of training aid 10 in accordance with its flexibility which enhances the teaching effectiveness of training aid 10. Specifically, FIG. 3 sets forth training aid 10 having the above-described expandable sleeve 11 which defines and internal passage 12. As is also described above, training aid 10 supports a plurality of eyelets 25 through 30 which in turn define apertures 35 through 40 respectively. As is also described above, a shoelace 41 is laced through apertures 35 through 40 of eyelets 25 through 30 such that end portions 42 and 43 emerge outwardly through apertures 40 and 39 respectively. In operation, a hand 60 belonging in this case to the instructor includes a thumb 61 and a plurality of fingers 62 formed in a generally flat palm down position. In accordance with the present invention, sleeve 11 is received upon hand 60 such that fingers 62 extend through passage 12 of sleeve 11 and such that eyelets 25 through 30 and shoelace 41 are positioned across the upper portion of hand 60. The positioning of sleeve 11 upon hand 60 permits the instructor to raise training aid 10 to a height whereby the learner may extend hands 54 and 55 conveniently and easily to grasp and manipulate ends 42 and 43 and may simultaneously receive teaching instruction on the knot tying process. It will be apparent to those skilled in the art that in accordance with another important aspect of the present invention, sleeve 11 may be positioned upon hand 60 in any number of alternate positions suited to the convenience of the teacher and learner. By way of further flexibility, training aid 10 may alternatively be fitted upon either hand 54 or 55 of the learner permitting the instructor to demonstrate the tying process on the learner's hand.

FIG. 4 sets forth an alternate embodiment of the present invention training aid generally referenced by numeral 70. Training aid 70 includes a generally cylindrical sleeve 41 formed of a flexible generally nonelastic material such as heavy cloth or the like. Sleeve 71 further includes an expandable section 72 secured to the remainder of sleeve 71 by a pair of seams 73 and 74. Sleeve 71 defines a passage 75 extending its entire length. A plurality of eyelets 80 through 85 are secured to sleeve 71 opposite expandable section 72 and arranged in the above-described pair of rows in a generally equally spaced arrangement. Eyelets 80 through 85 define corresponding apertures 90 through 95 which receive a shoelace 76 in the above-described manner. Shoelace 76 defines end portions 77 and 78 which in turn support end tabs 87 and 88 respectively.

The embodiment shown in FIG. 4 permits sleeve 71 to be formed largely of nonelastic material such as heavy cloth or leather. In addition, it should be noted that the operative portions of lace 76, namely end portions 77 and 78, may be separate from the remainder of lace 76. Alternatively, eyelets 80, 81, 83 and 84 may be eliminated and end portions 77 and 78 may be secured directly to sleeve 71 without departing from the spirit and scope of the present invention. By way of further alternate construction, lace 76 may be passed directly from eyelet 82 to eyelet 85 without the use of eyelets 80, 81, 83 and 84 which permits end portions 77 and 78 to emerge outwardly from eyelets 82 and 85 respectively and facilitate the use of training aid 70. In such case, eyelets 80, 81, 83 and 84 as well as the portion of lace 76 shown crossing therebetween, may either be retained in the manner shown in FIG. 4 to increase the realism of the present invention appearance or may alternatively be eliminated.

In either event, training aid 70 is utilized in the manner described above for training aid 10 in FIGS. 1 through 3 and provides the same flexibility and ease of use in the teaching process.

What has been shown is an improved training aid for use in teaching the process of shoelace tying. The training aid shown provides substantial flexibility of use and may be readily secured to a number of different shoe sizes and configurations. Additionally, the training aid shown may be secured to either the teacher or learner's hands to provide easier viewing of the tying operation and to increase the flexibility of use. The device shown in easy to construct and use and may be produced for substantially less cost than the prior art devices.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. A training aid for shoelace tying comprising:
    an expandable sleeve formed of a layer of flexible material configured to be attachable to the toe and instep portion of a shoe and expandable to accommodate a range of shoe sizes, said sleeve defining a plurality of apertures arranged in two generally parallel rows and having a continuous uninterrupted portion of said layer between said rows of apertures; and lace means including a plurality of generally annular eyelets supported within said apertures for supporting a shoelace such that the shoelace may be laced through said eyelets and the end portions of the shoelace extend from said expandable sleeve.

2. A training aid as set forth in claim 1 wherein said sleeve is formed of a sheet of expandable material.

3. A training aid as set forth in claim 2 wherein said sleeve includes a seam extending its entire length.

4. A training aid as set forth in claim 2 wherein said sleeve is formed of a first portion having a low expansion characteristic and a second portion having a highly expandable characteristic.

5. A training aid as set forth in claim 3 further including an elongated flexible shoelace extending through said eyelets and terminating in a pair of outwardly extending tying ends.

6. A training aid as set forth in claim 4 further including an elongated flexible shoelace extending through said eyelets and terminating in a pair of outwardly extending tying ends.

* * * * *